US009856116B2

(12) United States Patent
Ibrahim

(10) Patent No.: US 9,856,116 B2
(45) Date of Patent: Jan. 2, 2018

(54) DEVICE FOR CLEANING A MOVING HANDRAIL BELT

(71) Applicant: Malek Y. S. Ibrahim, Urbana, IL (US)

(72) Inventor: Malek Y. S. Ibrahim, Urbana, IL (US)

( * ) Notice: Subject to any disclaimer, the term of this patent is extended or adjusted under 35 U.S.C. 154(b) by 0 days.

(21) Appl. No.: 15/419,960

(22) Filed: Jan. 30, 2017

(65) Prior Publication Data

US 2017/0217735 A1 Aug. 3, 2017

Related U.S. Application Data

(60) Provisional application No. 62/290,601, filed on Feb. 3, 2016.

(51) Int. Cl.
*B65G 45/22* (2006.01)
*B66B 31/02* (2006.01)

(52) U.S. Cl.
CPC .................................... *B66B 31/02* (2013.01)

(58) Field of Classification Search
CPC ................................ B65G 45/22; B66B 31/02
USPC .......................................................... 198/495
See application file for complete search history.

(56) References Cited

U.S. PATENT DOCUMENTS 2,550,918 A 5/1951 Otto et al.
2,846,045 A 8/1958 Fowler
3,946,853 A 3/1976 Ishida
4,934,512 A 6/1990 Lin et al.
4,976,342 A 12/1990 Hwang
5,117,967 A * 6/1992 Morrow ................. B65G 45/22 198/494
7,134,539 B2 11/2006 Kim
7,225,915 B2 * 6/2007 Kelly ..................... B65G 45/24 198/494
7,347,314 B2 3/2008 Lombard
7,854,313 B1 12/2010 Gotsche
2011/0158862 A1 * 6/2011 Kim ........................ B66B 31/02 422/292
2012/0273003 A1 11/2012 Holloway et al.
2014/0186219 A1 7/2014 Yukimoto
2015/0047949 A1 2/2015 Røthe et al.

FOREIGN PATENT DOCUMENTS

WO 2011017828 A1 2/2011

* cited by examiner

*Primary Examiner* — James R Bidwell
(74) *Attorney, Agent, or Firm* — McDonnell Boehnen Hulbert & Berghoff LLP

(57) ABSTRACT

A self-driven device for cleaning moving handrail belts often found in electric escalators and walkways consists of a roller, fluid container, and fluid transfer apparatus. The roller rotates by being in contact with the moving belt and applies cleaning fluid to the belt to kill germs. The rotary motion of the roller is used to power the fluid transfer apparatus through a motion transfer mechanism. The fluid transfer apparatus transfers the fluid from a container, also provided within the device, to the roller. The present design acts in a way that does not require external power or complex control.

20 Claims, 10 Drawing Sheets

DEVICE FOR CLEANING A MOVING HANDRAIL BELT

CROSS-REFERENCE TO RELATED APPLICATIONS

This application claims priority to U.S. patent application Ser. No. 62/290,601, filed Feb. 3, 2016, which is hereby incorporated by reference in its entirety.

BACKGROUND

Unless otherwise indicated herein, the materials described in this section are not prior art to the claims in this application and are not admitted to be prior art by inclusion in this section.

The cleanliness of moving handrail surfaces, often found on electric escalators and walkways, is becoming an increasing concern for society. Such surfaces are in frequent contact with a large number of people's hands and are infrequently cleaned. Fifty years ago, in some countries, dedicated workers were hired to periodically clean handrail belts using house-cloth and disinfecting solution, but due to economic development and increasing labor expenses, it has become difficult to retain such labor.

Statistics show that fewer than 30% of Americans wash their hands after using the bathroom and, in the US alone, it is estimated that 50 million days of work are lost annually due to the common cold. Using soap is not a common practice when washing hands in other parts of the world. Therefore, with more than 1 billion travelers/year worldwide, global disease outbreaks, such as H1N1 and bird flu, have become increasingly likely. Moving handrail belts, widely used in airports, shopping stores, train stations, and other public facilities, can act as a transfer medium for germs. The Center for Disease Control and Prevention has identified these belts as capable of transferring infections and diseases from one individual to another.

In addition to the associated health risk of not cleaning these belts, some people refrain from using the handrails due to hygiene concerns. These individuals can be subjected to slipping or falling. This is especially worrisome for children, elderly people, and people with disabilities. Moreover, dirty handrail belts harm the image of the facility where the escalator is.

In order to address public health issues, some control measures have been taken in relation with the use of escalators. For example, during the outbreak of SARS and the H1N1 flu, health personnel were back-assigned specifically to disinfect the escalators independently to prevent public infections in some Asian countries. Somewhat surprisingly, this task of manually cleaning escalators has not yet seen widespread replacement by machines.

SUMMARY

The described device functions to clean handrails associated with electric escalators or moving walkways while in motion. The present invention aims to overcome the problems in prior designs and allow society to benefit from the mentioned function in an affordable, robust, and safe way. The device can be installed below the curved ends of the escalator newel adjacent to the edge of the skirt guard. The device, which consists of an application roller, a fluid container, a fluid transfer mechanism, connectors, and a motion transfer mechanism, may continuously apply a cleaning fluid to the belt. The cleaning fluid may be an aerosol, gel, liquid, or other cleaning substance that is chemically inert to the belt material and is not flammable or combustible to avoid safety related issues.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Example devices are described herein. Any example embodiment or feature described herein is not necessarily to be construed as preferred or advantageous over other embodiments or features. The example embodiments described herein are not meant to be limiting. It will be readily understood that certain aspects of the disclosed devices can be arranged and combined in a wide variety of different configurations, all of which are contemplated herein.

Furthermore, the particular arrangements shown in the figures should not be viewed as limiting. It should be understood that other embodiments might include more or less of each element shown in a given figure. In addition, some of the illustrated elements may be combined or omitted. Similarly, an example embodiment may include elements that are not illustrated in the figures.

The function of the described invention is to clean the moving handrails without the need to stop the escalator or inhibit passengers' movements. The device can be installed bellow the curved ends of the escalator newel without occupying extra space or adversely affecting escalator safety. Unlike prior designs, the device provides for more uniform operation and requires less maintenance.

Figure 1:
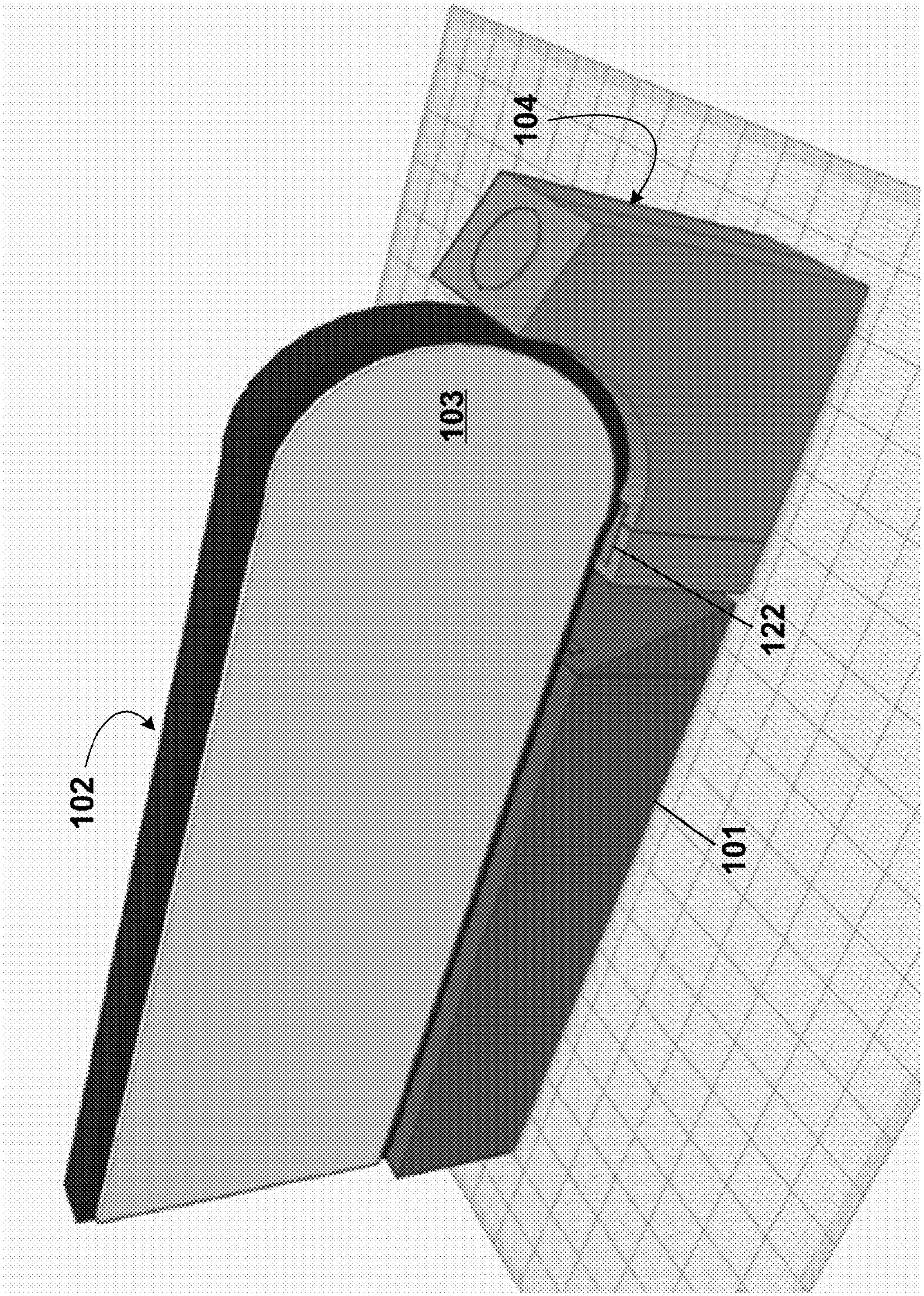
FIG. 1 is an isometric view of an installed device, according to an example embodiment.
Figure 2:
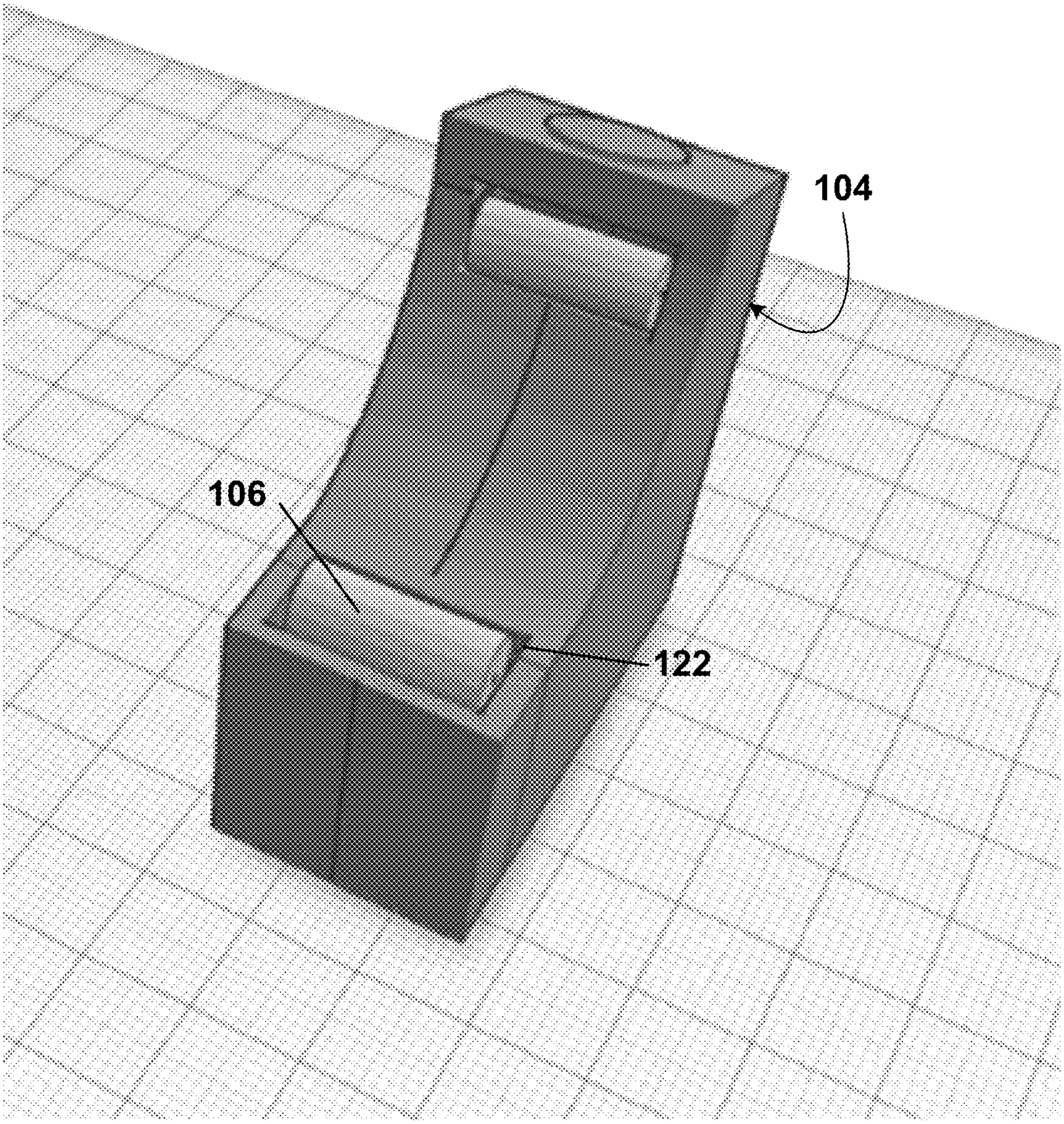
FIG. 2 is an isometric view of a device, according to an example embodiment.

In the embodiment shown in FIGS. 1 to 5, the cleaning device 104 is fitted at the entrance side of the escalator or the walkway where the handrail belt 102 comes out from the skirt guard 101. The outer enclosure of the device 104 may be made out of plastic, metal sheets, or any other solid material and is arced to take the shape of the lower half of the escalator newel 103, as shown in FIG. 1. A window 122 may be provided at the lower part of the enclosure to allow the roller to be in direct contact with the escalator belt 102, as shown in FIG. 2. As the escalator belt 102 moves, the roller 106 rotates in the direction of motion and applies a layer of the cleaning fluid to the belt 102. The roller outer surface may be covered with a cleaning material with high liquid absorbing capacity such as pile fabric, foam rubber, or micro-fiber. The roller length is equal to or larger than the belt width so that it covers the whole belt 102. The roller is detachable, enabling it to be replaced when it gets dirty.

Figure 3:
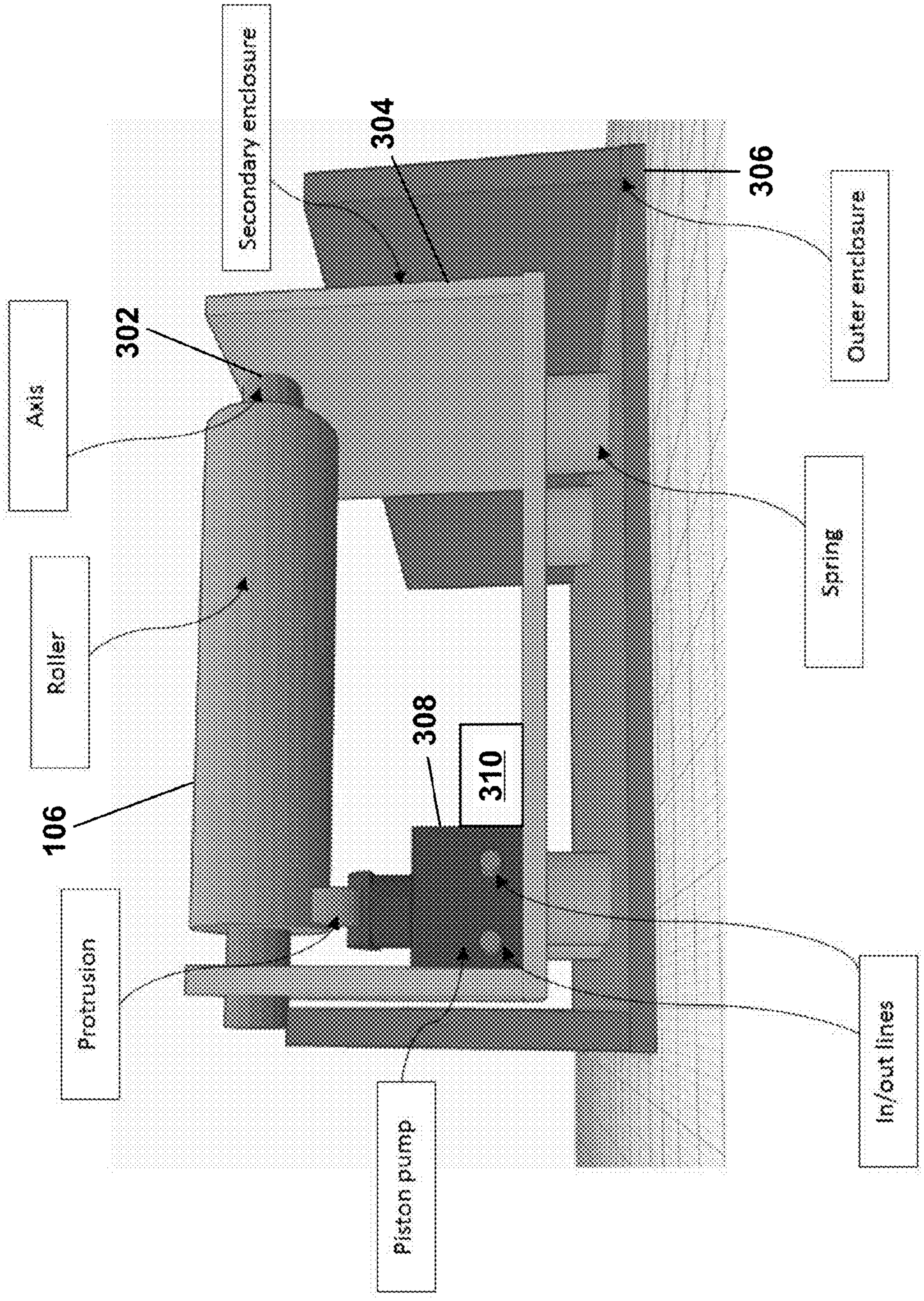
FIG. 3 is an isometric view of a secondary enclosure, according to an example embodiment.

The roller 106 rotates around a fixed axis 302 that is confined between the two sides of a secondary enclosure 304 described in FIG. 3. The secondary enclosure 304 has an open top and its height from the outer enclosure 306 base can be adjusted using springs, scissor lifts, or pistons in order to keep the roller in pressed contact with the belt 102, regardless of the belt elevation from the ground. The fluid transferred out from the roller 106 to the belt 102 gets replenished by intermittently transferring doses of the fluid from the fluid container to the roller 106 through the fluid transfer apparatus 308 which is also mounted in the secondary enclosure. The amount of fluid transferred to the roller 106 may sufficiently coat the roller 106, but may not be such a large amount as to saturate the roller 106. Such a design would prevent too much fluid within the roller 106 region, and thereby prevent buildup of excess fluid in the secondary enclosure 304. Furthermore, it ensures that any drying mechanism used by the device additionally does not become saturated with cleaning fluid, thereby allowing the drying mechanism to effectively function.

The fluid transfer apparatus 308 may be a pump, dispenser, or other known means of fluid transfer. The fluid transfer apparatus 308 can be powered by an external alternating current (AC) device or by utilizing the motion of the escalator belt 102 itself through a rotary motion transfer mechanism that directly drives the fluid transfer apparatus 308 and/or charges a rechargeable battery using a generator. As illustrated, the fluid transfer apparatus 308 may be powered by a chargeable battery 310, wherein the battery 310 runs the fluid transfer apparatus 308 without the need for external power.

Figure 4:
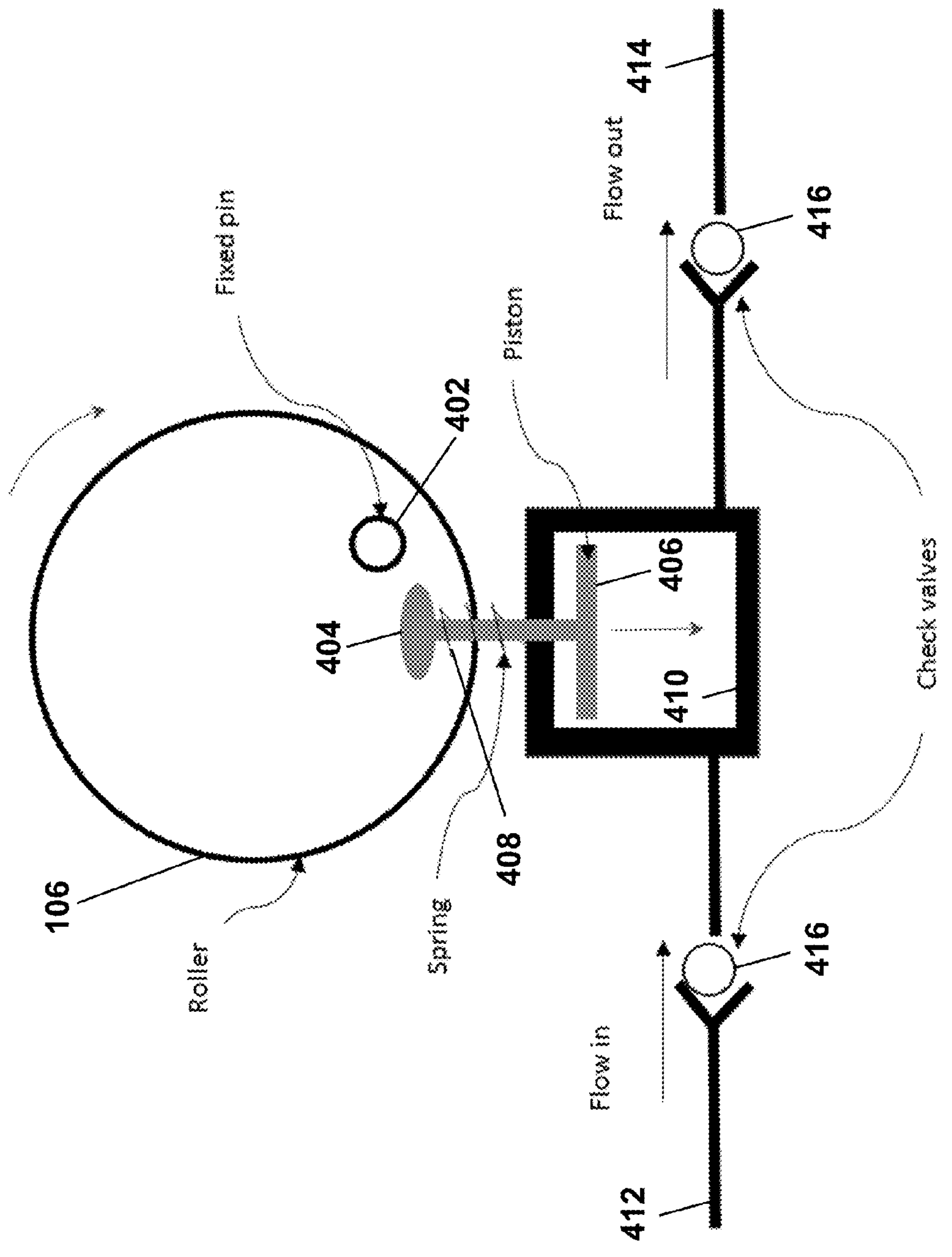
FIG. 4 is a diagram illustrating a direct motion transfer scheme, according to an example embodiment.

In the embodiment depicted in FIG. 4, one of the roller 106 sides is equipped with a pin 402 or a protrusion that presses a piston 406 down at the position where it is in contact with the piston head 404. The piston's downward movement pushes the fluid out from the piston chamber to the applicator roller 106, which can be fitted with means for fluid distribution, such as nozzles aiming towards the roller 106 surface from the inside or the outside. When the pin 402 or the protrusion of the roller 106 is not in contact with the piston head 404, the piston 406 moves upward by the act of a spring 408 to refill the chamber 410 with the fluid by fluid suction from the container through the feed line 412. This may occur at the beginning of a new piston 406 cycle.

The check valves 416 fitted on the feed 412 and discharge 414 lines are used to confine the fluid motion to only one direction, either from the container to the applicator (or vice versa), but not the opposite. As the piston 406 moves upward, it creates a suction in the chamber 410 but only flow from the inlet side is allowed, as the check valve 416 on the outlet side blocks fluid from returning back to the chamber 410. As the piston 406 moves downward, it pushes the fluid out, but only on the discharge side as the flow through the inlet side is blocked by the other check valve 416.

Figure 5:
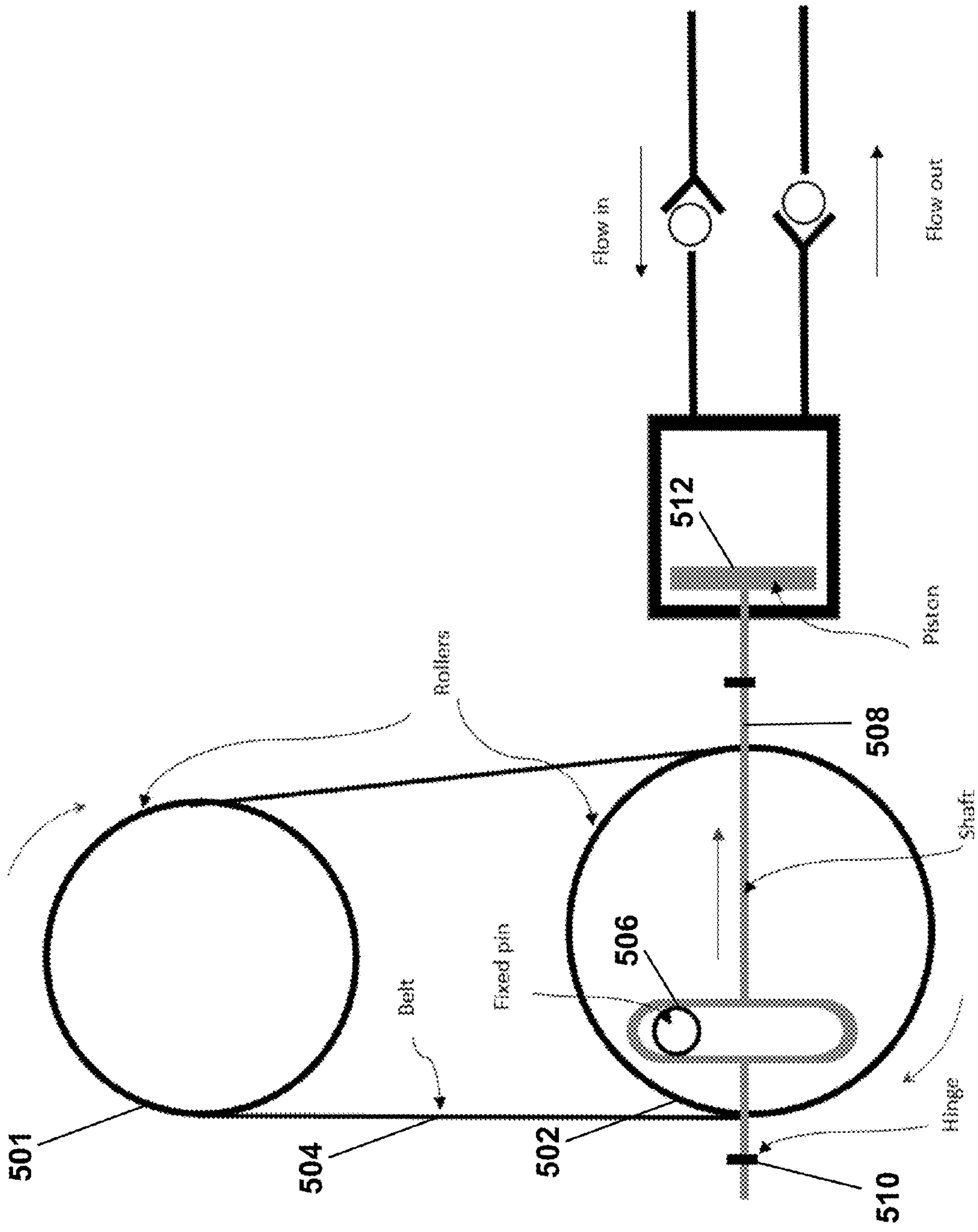
FIG. 5 is a diagram illustrating an indirect motion transfer scheme, according to an example embodiment.

In another embodiment, depicted in FIG. 5, the roller 501 in contact with the escalator belt 102 transfers the rotary motion to another roller 502 through a belt. The other roller 502 is equipped with a fixed pin 506 and a hook attached to the piston shaft 508. This is similar to the well-known Scotch yoke mechanism. Other ways for motion transfer may be applied, such as gears and shafts. Additionally, other methods of fluid transfer may be used, such as a rotary pump, a diaphragm pump, or a reciprocating pump. It may also be possible to control the frequency of pump motion by setting the number of teeth on the rotating gears that transfer the motion from the roller 502 to the pump. For instance, a specific gear ratio could be used to enable the pump to transfer one doze every preset number of roller cycles.

Figure 6:
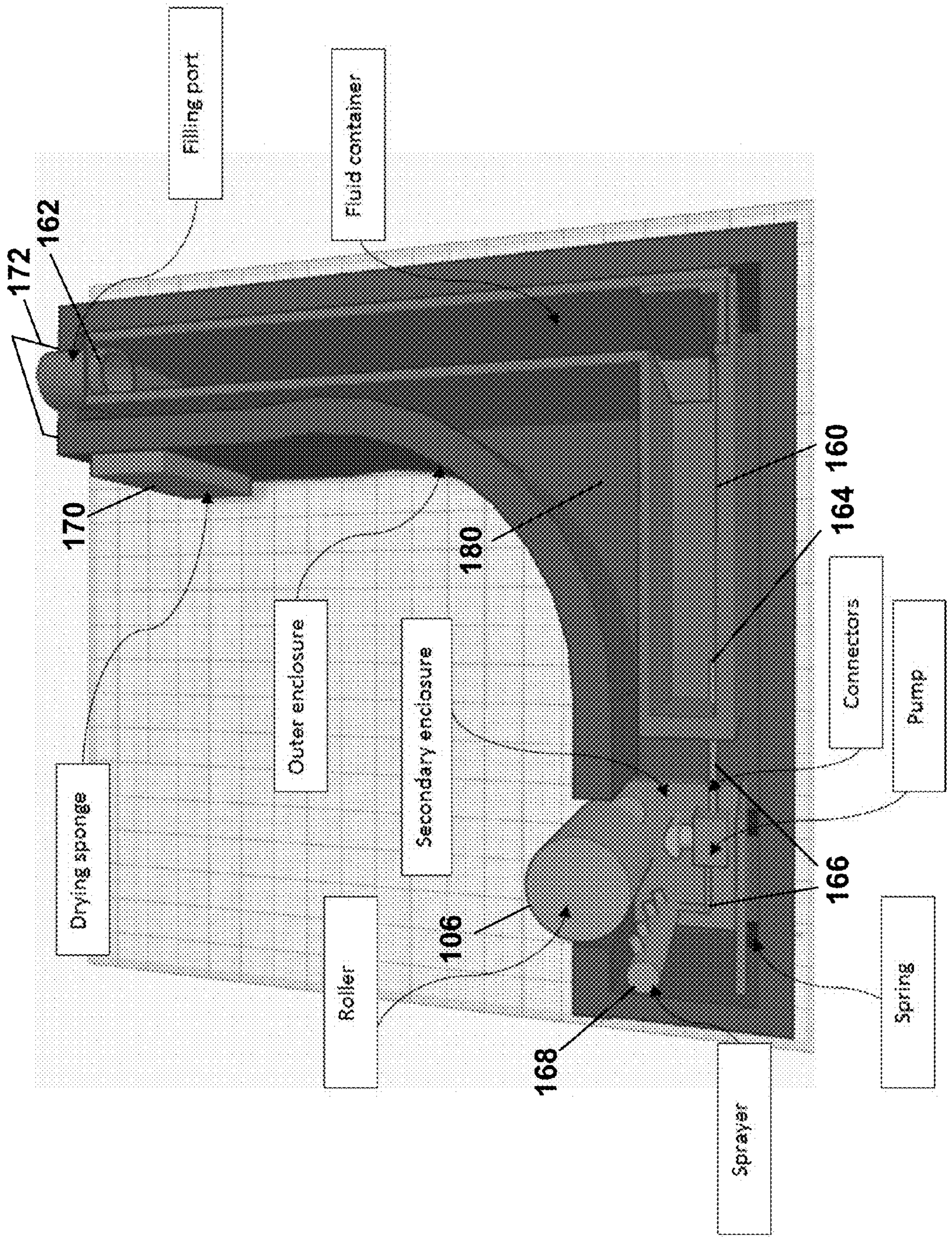
FIG. 6 is a side view of an isometric cross section of another device, according to an example embodiment.

As presented in FIG. 6, the fluid container 160 is a confined space with two openings; one at the top for refill 162 and the other at the bottom for fluid discharge 164. The refill opening is covered with a threaded cap, hinged lid 172, or other type of cover. The connectors 166 from the container to the position chamber, and from the piston chamber to the applicator 168 (e.g., sprayer), may be flexible tubes, hoses, or other flowing fluid ducts. The openings in the piston chamber, container, and applicator 168, however, are fitted with fittings suitable for a specific installation, such as barbed nozzles or flanges. At the other end of the device arc, a drying roller or sponge 170 is provided to wipe off remaining traces of the cleaning fluid and allow the belt to come out of the device dry. This drying roller or sponge 170 may be dried using evaporative losses to a region surrounding the device. As presented in FIG. 6, some embodiments may include a window 180 for liquid level indication.

Figure 7:
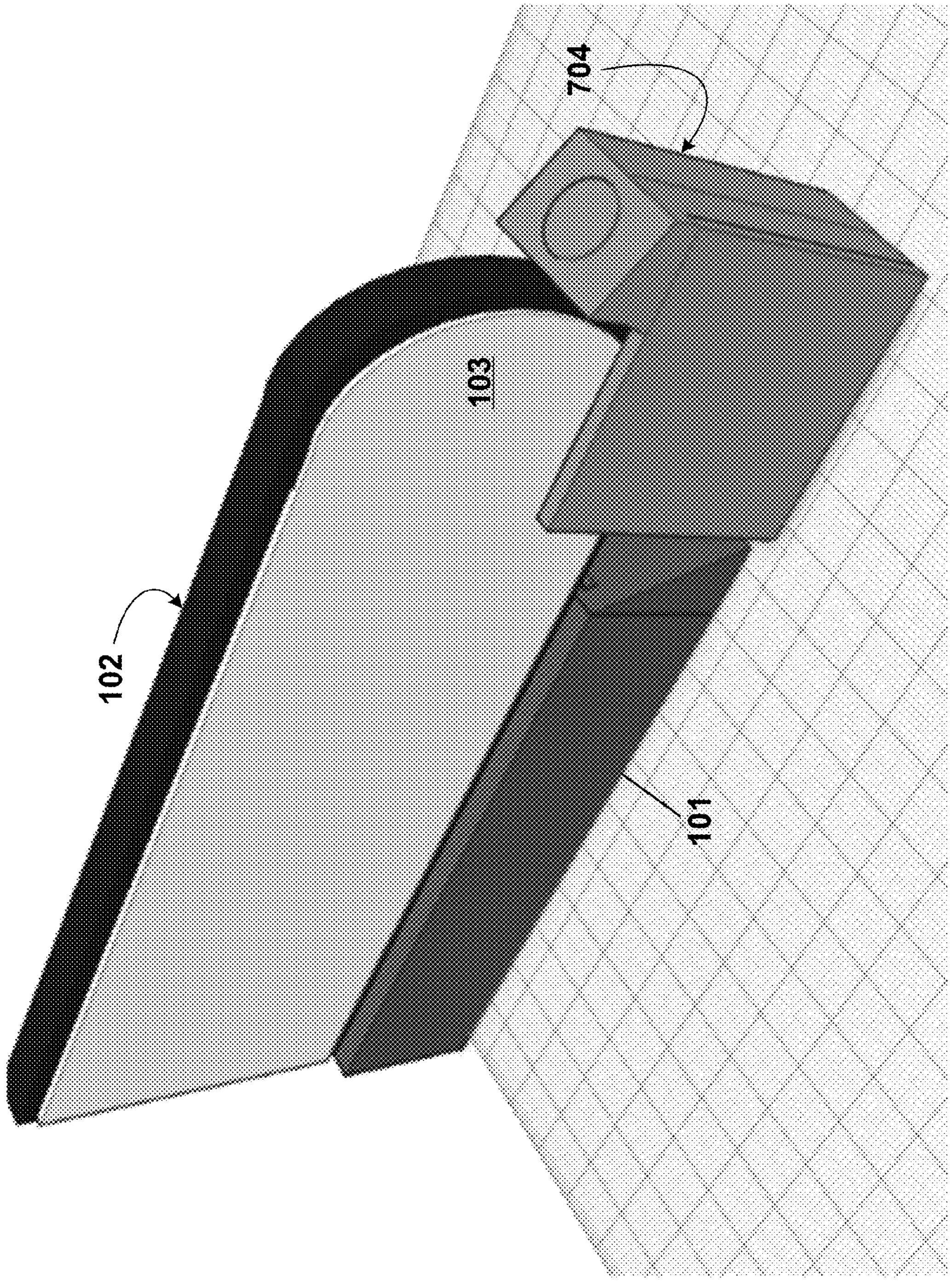
FIG. 7 is an isometric view of another installed device, according to an example embodiment.
Figure 8:
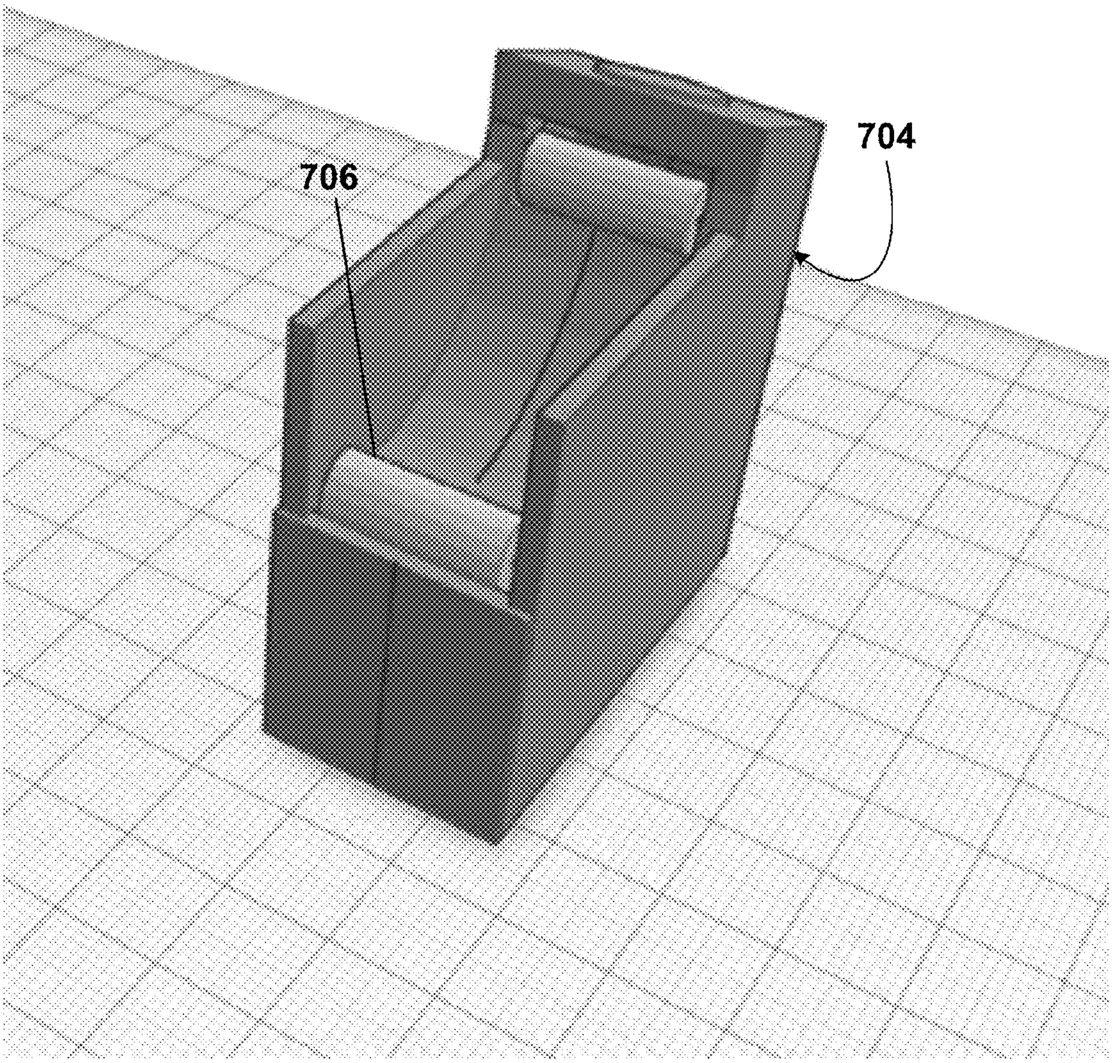
FIG. 8 is an isometric view of another device, according to an example embodiment.
Figure 9:
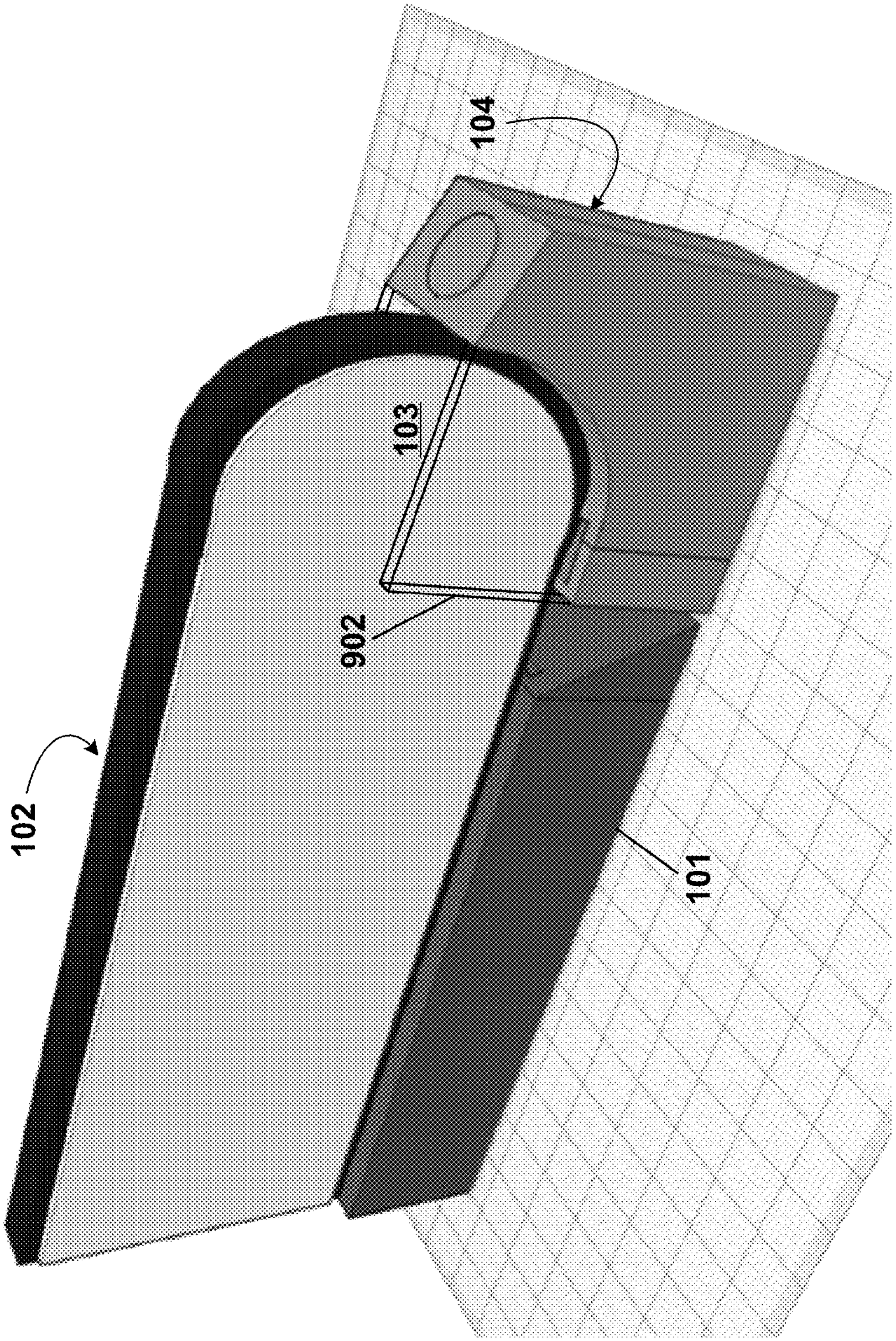
FIG. 9 is an isometric view of an installed device, according to an example embodiment.
Figure 10:
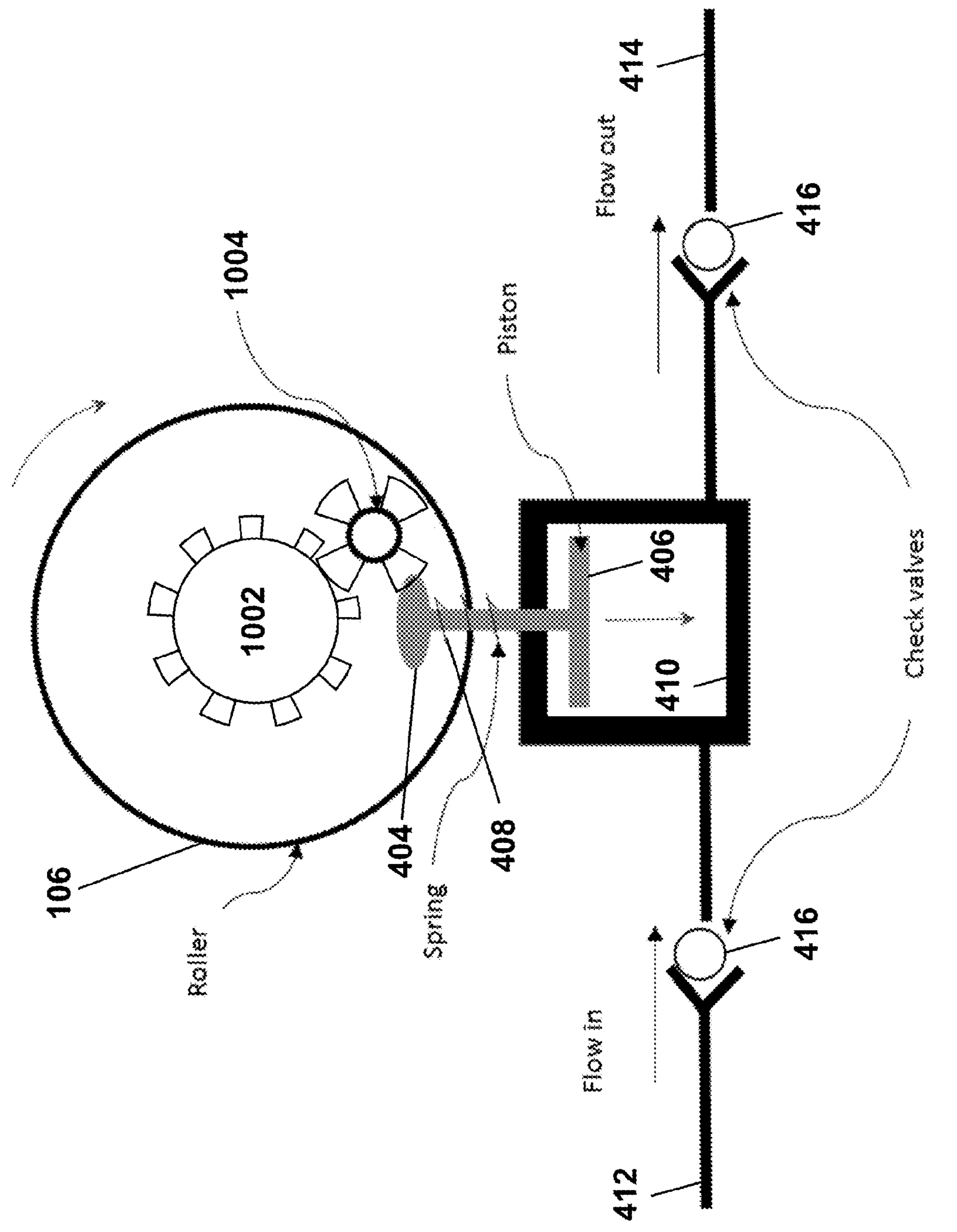
FIG. 10 is a diagram illustrating a direct motion transfer scheme, according to an example embodiment.

As presented in FIGS. 7 and 8, the top part of the arced device 704 may be equipped with a guard made of elastic material. This material would fill the gap between the enclosure and the belt 102, thereby protecting the fingers of passengers. This is particularly useful for children, who commonly keep their hands on the handrail after reaching the end of the escalator path. The guard may additionally prevent users of the moving handrail from incidentally interfering with the cleaning/fluid mechanisms of the device 704. As presented in FIG. 9, some embodiments may include a window 902 for roller installation. As presented in FIG. 10, some embodiments may include a first frequency over which the fluid transfer apparatus is actuated is different from a second frequency over which the driving roller rotates, which is enabled by a series of gears 1002/1004 with a specified number of teeth corresponding to the ratio of the first frequency to the second frequency.

From the preceding explanation of the preferred embodiments, it is evident that the objects of the invention are attained and although the components of the device 104/704 are described in detail, it is to be clearly understood that the described embodiments are only examples for illustration and are not to be taken by way of limitation. It is apparent to those who are skilled in the art that other variations and modifications are also included. The true spirit and scope of the invention is only limited by the following claims.

I claim:

1. A device for cleaning a moving handrail belt, comprising:

an enclosure including one or more rollers, a motion transfer mechanism, a fluid container, and a fluid transfer apparatus, wherein the motion transfer mechanism and the fluid transfer apparatus are fixed in a secondary, open-top enclosure with adjustable height, enabling the one or more rollers to be in pressed contact with the moving handrail belt.

2. The device of claim 1, wherein the device is made out of plastic, metal, or other solid materials, and wherein the device can take the shape of a rectangular or arced box and is provided with windows for roller installation and liquid level indication.

3. The device of claim 1, wherein the outer surface of the one or more rollers is covered with liquid retaining material and is in direct contact with the escalator belt.

4. The device of claim 3, wherein the liquid retaining material is selected from the group consisting of fiber, fabric, and rubber.

5. The device of claim 1, wherein the one or more rollers are capable of disengagement from the axis and are fitted with pins, gears, or belts for motion transfer.

6. The device of claim 1, wherein the fluid transfer apparatus is a piston pump or a reciprocating pump.

7. The device of claim 1, wherein the fluid transfer apparatus is powered by an alternating current circuit or by a transfer of motion of the moving handrail belt, using the motion transfer mechanism, to the fluid transfer apparatus or to a chargeable battery, and wherein the battery runs the apparatus without the need for external power.

8. The device of claim 1, wherein the motion transfer mechanism is a pin fixed on a rotating roller that actuates the fluid transfer apparatus, a series of belts and rollers, or other motion transfer mechanisms.

9. The device of claim 8, wherein a first frequency over which the fluid transfer apparatus is actuated is different from a second frequency over which the driving roller rotates, which is enabled by a series of gears with a specified number of teeth corresponding to the ratio of the first frequency to the second frequency.

10. The device of claim 1, wherein outer surfaces of the one or more rollers are covered with cleaning material with high liquid absorbing capacity.

11. The device of claim 10, wherein the cleaning material with high liquid absorbing capacity is pile fabric, foam rubber, or micro-fiber.

12. The device of claim 1, wherein the fluid container is a confined volume made of plastic, metal, or other solid materials, and wherein the fluid container comprises openings for refill and discharge.

13. The device of claim 12, wherein the openings are covered by hinged lids.

14. The device of claim 1, wherein a cleaning fluid flows from the fluid container to the fluid transfer apparatus, and from the fluid transfer apparatus to the one or more rollers through a series of fluid connectors.

15. The device of claim 14, wherein the fluid connectors are flexible tubes, hoses, or other connecting means.

16. The device of claim 1, wherein one end of the fluid transfer apparatus is a nozzle configured to aim cleaning liquid toward the one or more rollers.

17. The device of claim 1, wherein the device only cleans the moving handrail belt when in motion.

18. The device of claim 17, wherein a rate at which cleaning fluid is applied to the moving handrail belt is proportional to the speed of the moving handrail belt.

19. The device of claim 1, wherein the device further comprises a drying element configured to remove excess cleaning fluid when present.

20. The device of claim 19, wherein the drying element is a roller, sponge, or other surface drying means.

* * * * *